M. M. GLEESON.
FISH GUARD.
APPLICATION FILED OCT. 7, 1913.

1,100,870.

Patented June 23, 1914.

2 SHEETS—SHEET 1.

Witnesses
C. N. P. Newbold
Chas. F. Shunn

Inventor
M. M. Gleeson
By
Attorney

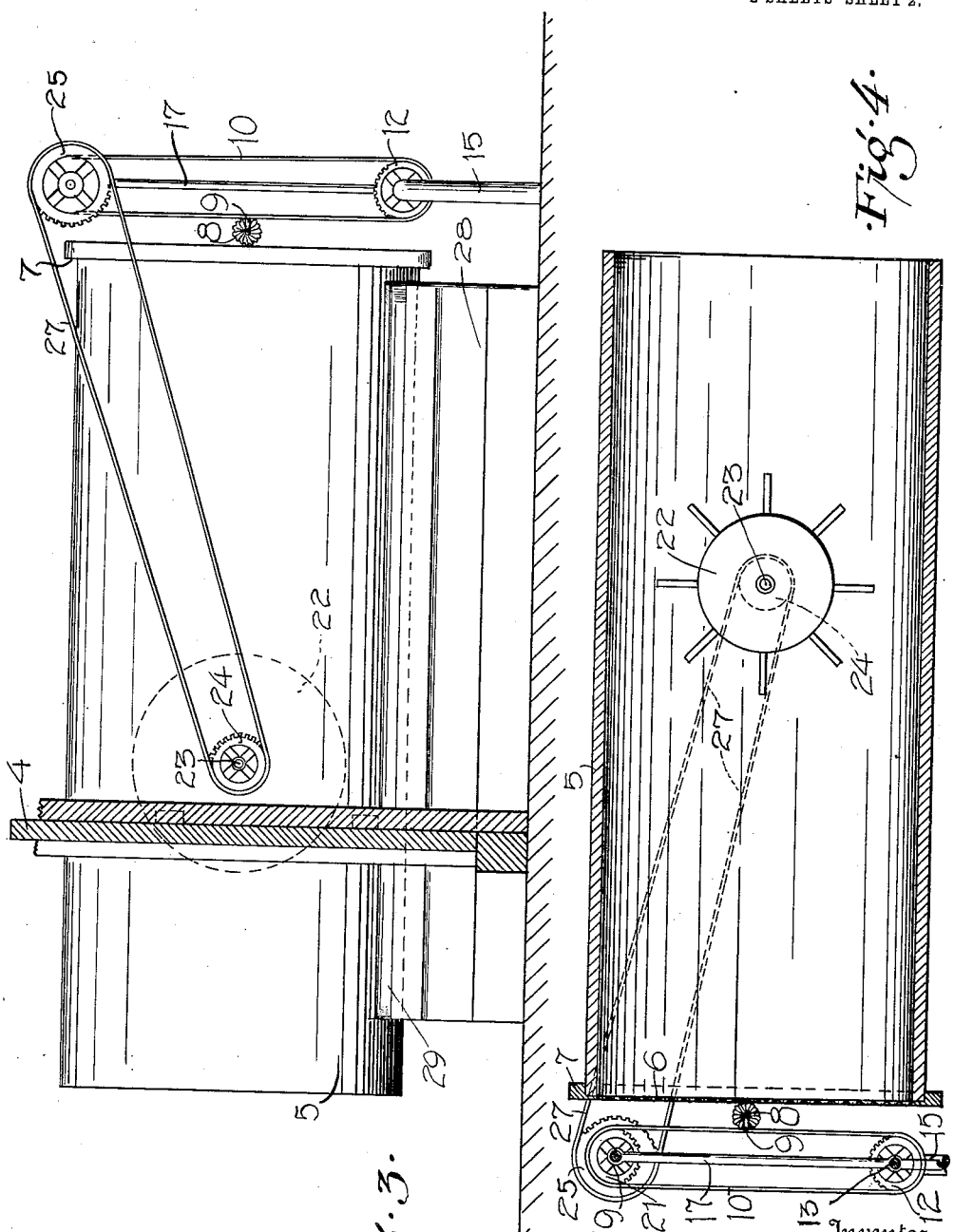

UNITED STATES PATENT OFFICE.

MICHAEL M. GLEESON, OF NEW YORK, N. Y.

FISH-GUARD.

1,100,870.  Specification of Letters Patent.  Patented June 23, 1914.

Application filed October 7, 1913. Serial No. 793,847.

*To all whom it may concern:*

Be it known that I, MICHAEL M. GLEESON, a subject of the King of Great Britain, residing at New York, in the county of New York and State of New York, have invented certain new and useful Improvements in Fish-Guards; and I do hereby declare the following to be a full, clear, and exact description of the invention, such as will enable others skilled in the art to which it appertains to make and use the same.

My invention relates to devices for preventing fish from running from streams into irrigation ditches.

An important object of my invention is to provide a device of the character described which will automatically clean the screen forming a part of the invention and may be readily attached to flood gates, etc.

A further important object resides in the provision of a pipe arranged in the flood gate to permit water to flow therethrough that is provided at its outer terminal with a screen to prevent fish from passing from the pipe, said screen being automatically cleaned by a traveling, rotating brush that is operated automatically by the flow of water through the pipe.

A still further object of importance is to provide a device such as described which consists of few parts, is reliable and efficient in its operation, and cheap to manufacture.

The above and additional objects are accomplished by such means as are illustrated in the accompanying drawings, described in the following specification and then more particularly pointed out in the claims which are appended hereto and form part of this application.

Figure 1:
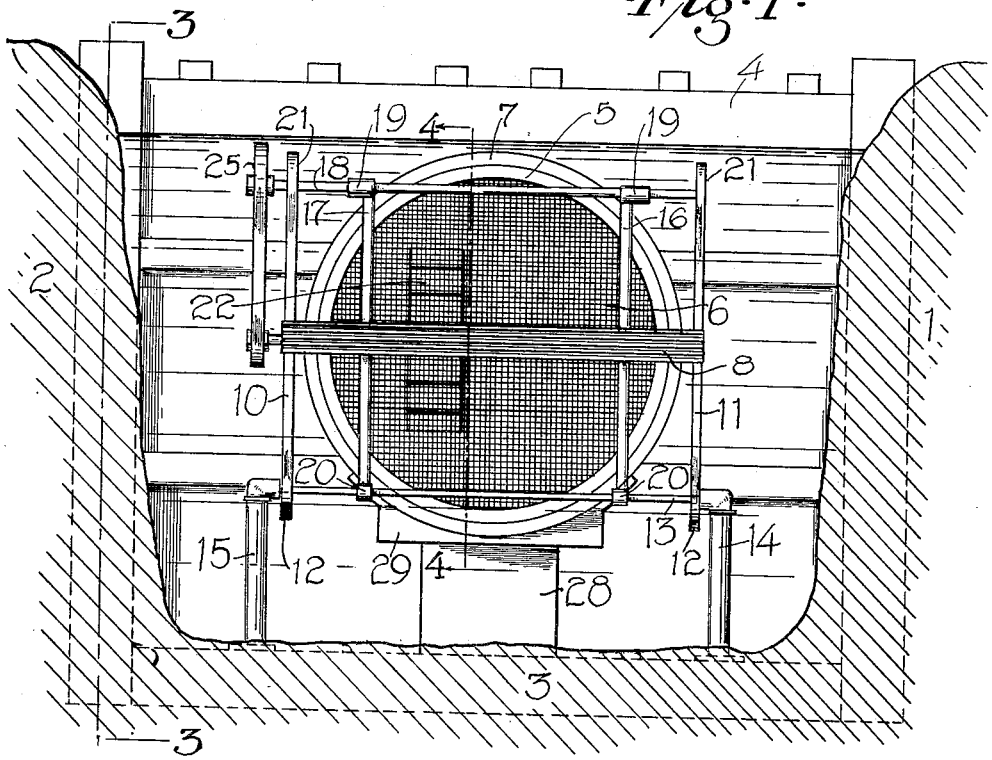
Figure 2:
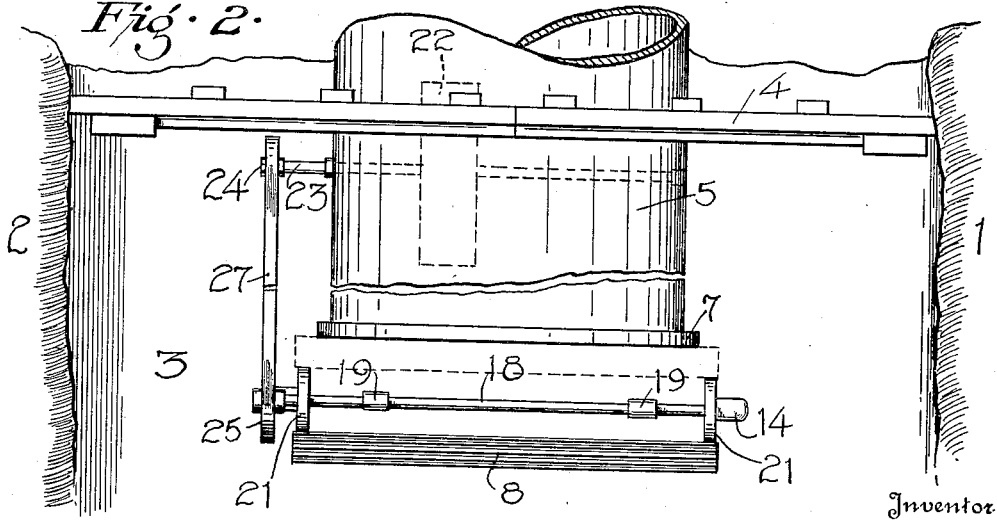

With reference to the drawings, wherein I have illustrated the preferred embodiment of my invention as it is reduced to practice, and throughout the several views of which similar reference numerals designate corresponding parts: Figure 1 is a sectional view illustrating the flood gate having the guard of my improved construction attached thereto, and showing it in elevation, Fig. 2 is a fragmentary top plan view, Fig. 3 is a vertical sectional view taken on line 3—3 of Fig. 1, and Fig. 4 is a longitudinal sectional view taken on line 4—4 of Fig. 1 particularly illustrating the brush and mechanism for operating it.

Referring to the drawings by numerals, 1 and 2 designate the banks of an irrigating ditch, while the numeral 3 designates the bottom thereof. A flood gate designated as an entirety by the numeral 4 of any suitable construction is mounted transversely of the ditch and adapted to support the fish guard of my improved construction which will be hereinafter described.

The fish guard consists of a section of cylindrical pipe designated 5 as an entirety. This pipe is mounted upon the flood gate 4 so that it is disposed in spaced relation to the bottom 3 and banks 1 and 2 of the ditch. The pipe 5 extends beyond the gate 4 for a slight distance upon both sides thereof, and is fitted terminally with the screen 6 that is supported in the desired position upon the pipe 5 by means of a supporting ring 7 which is fitted about the pipe. Thus it will be seen that while water is permitted to flow through the pipe, fish or foreign matter will be stopped by engagement with the screen 6 at the outer end of the pipe.

There has been provided means for preventing the accumulation of leaves and other foreign matter at the screen which prevents the flow of water through the pipe, which consists of a brush designated as an entirety by the numeral 8. This brush 8 is rotatably journaled in supporting arms 9 that are fixed to one of the links upon each chain of a pair designated 10 and 11. These chains 10 and 11 are mounted for rotation in a vertical plane on the sprocket wheels 12 that are carried adjacent the terminals of a horizontal shaft 13. This shaft 13 is journaled for rotation at its terminals in a pair of vertical supporting standards 14 and 15 that are secured at their bases in any suitable manner upon the bottom 3 of the ditch. A pair of vertical spaced supports 16 and 17 are provided at their upper terminals with bearing portions 19 for a horizontal shaft 18 that is supported in the same spaced relation to the adjacent end of the pipe 5, as is the shaft 13. A pair of bearing portions 20 are formed integral with the supports 16 and 17 and adapted to assist the supports 14 and 15 in supporting the shaft 13. A pair of sprocket wheels designated 21 are mo ed adjacent the terminals of the shaft 18 on the shaft and are adapted to rotate the with so as to impart a rotary movement to the chains 10 and 11 carrying the brush 8. A paddle wheel designated 22 as an entirety is mounted within the pipe 5 upon a shaft 23 that is journaled through one side of the pipe transversely thereof. A sprocket wheel 24 is keyed upon the outer terminal of this shaft 23. A sprocket wheel 25 is keyed upon the shaft 18 and is connected with the sprocket wheel 24 by means of a chain 27. It will thus be seen that when water, flowing through the pipe 5 encounters the paddle wheel that a rotary motion is imparted to the chains 10 and 11, through the medium of the paddle wheel 22, shaft 23, sprocket wheel 24, chains 27 and gears 25 and 21. The brush 8 in being carried by the rotary chains 10 and 11 moves into engagement with the screen 6, and by such engagement is caused to rotate whereby all foreign matter will be brushed from the screen and water will be permitted to flow freely therethrough and into the pipe 5, thus automatically cleansing the screen.

A longitudinal support designated 28 is mounted upon the bottom 3 of the ditch, engages the under surface of the pipe 5 and assists the flood gate 4 in supporting the pipe. This support 28 consists of a vertical standard carrying a concave block 29 upon its upper terminal that is adapted for engagement with the rounded under face of the pipe 5.

With reference to the foregoing description and accompanying drawings it is apparent that a device has been provided which will positively prevent fish from passing from the reservoir into the irrigating ditches and that the screen for providing such action is efficiently and automatically cleansed of all debris which may be collected thereon by the action of the traveling and rotating brush.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim is:

1. In a device of the character described, the combination with a flood gate for irrigating ditches, of a pipe mounted thereon, a screen fitted over the outer terminal of said pipe and means for preventing the accumulation of foreign matter upon the screen mounted adjacent one terminal of said pipe comprising a traveling brush adapted to be rotated by frictional engagement with said screen.

2. In a device of the character described, the combination with a flood gate for irrigating ditches of a pipe mounted thereon and extending therethrough on each side thereof, a screen fitted over the outer terminal of said pipe, a pair of chains mounted for rotation in a vertical plane adjacent one terminal of said pipe in spaced relation thereto, means for rotating said chains and a brush journaled for rotation upon said chains transversely thereof and adapted for engagement with the adjacent screen during its movement with the chain.

3. In a device of the character described, the combination with a flood gate of an irrigating ditch, of a pipe mounted upon said gate, said pipe extending outwardly beyond the sides of the said gate in spaced relation to the bottom and side walls of the irrigating ditch, means for supporting said pipe, a pair of spaced chains mounted for rotation in a vertical plane adjacent one terminal of said pipe, a screen fitted over the outer terminal of said pipe, means for supporting said chains in spaced relation to the pipe, means for rotating said chains and means journaled transversely upon said chains adapted to engage the screen and be rotated during the rotation of said chains to cleanse said screen.

4. In a device of the character described, the combination with a flood gate of an irrigating ditch, of a cylindrical pipe mounted thereon, means for supporting said pipe in spaced relation to the bottom of said ditch, said pipe extending outwardly beyond the sides of said gate, a screen fitted over the outer terminal of said pipe, a pair of spaced shafts rotatably journaled adjacent the upper and lower terminals of said pipe at one terminal thereof in spaced relation thereto, a paddle wheel rotatably journaled within said pipe and operatively connected with one of said shafts, a plurality of spaced sprocket wheels mounted upon said shaft, chains mounted upon said sprocket wheels, means for supporting said shafts, a brush secured transversely of and to said chains and said brush adapted for rotation by frictional contact with the adjacent screen during the rotation of said chains to remove foreign matter from said screen.

In testimony whereof I affix my signature in presence of two witnesses.

MICHAEL M. GLEESON.

Witnesses:
EDWIN ARTHUR BATES,
RALPH COHN.